United States Patent
Huang

(10) Patent No.: US 8,761,262 B2
(45) Date of Patent: Jun. 24, 2014

(54) MOTION VECTOR REFINING APPARATUS

(75) Inventor: Zheng-Bin Huang, Kaohsiung (TW)

(73) Assignee: Sunplus Technology Co., Ltd, Hsinchu (TW)

( * ) Notice: Subject to any disclaimer, the term of this patent is extended or adjusted under 35 U.S.C. 154(b) by 377 days.

(21) Appl. No.: 13/253,983

(22) Filed: Oct. 6, 2011

(65) Prior Publication Data

US 2012/0288001 A1    Nov. 15, 2012

(30) Foreign Application Priority Data

May 12, 2011    (TW) .............................. 100116697 A

(51) Int. Cl.
*H04N 11/02*    (2006.01)
*G06K 9/48*    (2006.01)

(52) U.S. Cl.
USPC ..................................... 375/240.16; 382/199

(58) Field of Classification Search
CPC ..... H04N 7/50; H04N 7/26244; H04N 5/145; H04N 7/26765; H04N 7/26015; G06T 7/0083; G06T 2207/10016; G06T 7/0085; G06T 5/001; G06K 9/48
USPC ..................................... 375/240.16; 382/199
See application file for complete search history.

(56) References Cited

U.S. PATENT DOCUMENTS

| | | | |
|---|---|---|---|
| 5,534,946 A | 7/1996 | De Haan et al. | |
| 2006/0062304 A1* | 3/2006 | Hsia | 375/240.16 |
| 2007/0230577 A1* | 10/2007 | Kobayakawa | 375/240.16 |
| 2008/0089417 A1* | 4/2008 | Bao et al. | 375/240.16 |
| 2010/0232509 A1* | 9/2010 | Incesu et al. | 375/240.16 |

* cited by examiner

*Primary Examiner* — Dave Czekaj
*Assistant Examiner* — Tsion B Owens
(74) *Attorney, Agent, or Firm* — Jianq Chyun IP Office

(57) ABSTRACT

A motion vector refining apparatus including a control unit, N filter units, and a mixer unit is provided. The control unit receives a motion estimation signal generated by a motion estimation unit and calculates a plurality of variation parameters according to a current motion vector, surrounding motion vectors, or a block matching error, so as to generate a control signal. The N filter units respectively calculate N filtering motion vectors by using N analysis processes. The mixer unit weights and mixes the filtering motion vectors according to the control signal to adjust and output a refined motion vector. Thereby, the motion vector refining apparatus can detect the edge of a moving object and mix filtering results of the analysis processes to adjust and refine motion vectors, so as to reduce image defects caused by a smooth processing.

15 Claims, 8 Drawing Sheets

MOTION VECTOR REFINING APPARATUS

CROSS-REFERENCE TO RELATED APPLICATION

This application claims the priority benefit of Taiwan application serial no. 100116697, filed on May 12, 2011. The entirety of the above-mentioned patent application is hereby incorporated by reference herein and made a part of this specification.

BACKGROUND OF THE INVENTION

1. Field of the Invention

The invention generally relates to a motion estimation and compensation technique, and more particularly, to a motion vector refining apparatus which can increase vertical resolution of an image.

2. Description of Related Art

Existing image display techniques usually adopt an interlace scan mode (usually applied to cathode ray tube (CRT) TVs) and a progressive scan mode (usually applied to digital TVs or digital cinemas). In the interlace scan mode, only half of the scan lines in an image are transmitted or played each time (i.e., scan lines in odd numbers (referred to as an odd field) and scan lines in even numbers (referred to as an even field) in the image are alternatively played). Since each field only contains data of the scan lines in odd or even numbers, vertical discontinuity is produced in a displayed image. Contrarily, in the progressive scan mode, the scan lines in an image are played one by one. However, the frame rate in the progressive scan mode is usually much lower than that in the interlace scan mode. Accordingly, image discontinuity or motion blur may be produced in a displayed image.

In order to increase image resolution and smoothness and avoid image discontinuity and motion blur, conventionally, a "motion adaptive deinterlacing" technique is adopted to increase the vertical resolution in a motion image in the interlace scan mode. In recent years, a "motion compensated deinterlacing" technique is further adopted to increase the vertical resolution of an image. In the motion compensated deinterlacing technique, the motion trajectory of a moving object in an image is predicted, and new pixel data is interpolated on the motion trajectory, so that the lost field can be effectively compensated and the resolution in the vertical direction can be effectively retained. Accordingly, image motion is made very clear and image blur is avoided. Regarding the progressive scan mode with lower frame vertical resolution, the lost part of an image can be interpolated on the time axis through the technique described above, so that the vertical resolution of the output image signal can be increased.

In the motion compensated deinterlacing technique, in order to make the motion vectors of the same moving object to be distributed more consistently, a smooth processing is performed on the motion vectors of neighboring macroblocks to reduce the variations of the motion vectors. However, motion vector estimation error, and accordingly image defects (for example, halation), may be produced when the smooth processing is performed at where the images of two moving objects meet each other or at the edges of dynamic and static areas. Thereby, an estimation and compensation technique for refining motion vectors is desired.

SUMMARY OF THE INVENTION

Accordingly, the invention is directed to a motion vector refining apparatus which can detect the discontinuous edge portions of a moving object and control a filtering condition of motion vectors accordingly, so as to reduce image defects caused by a smooth processing.

The invention provides a motion vector refining apparatus including a control unit, N filter units, and a mixer unit, wherein N is a positive integer and is greater than 1. The control unit receives a motion estimation signal generated by a motion estimation unit, wherein the motion estimation signal includes a plurality of total motion vectors, and the total motion vectors include a current motion vector corresponding to a current macroblock and a plurality of surrounding motion vectors. The control unit calculates a variation parameter according to the current motion vector and the surrounding motion vectors, so as to generate a control signal. The N filter units respectively analyze the total motion vectors by using N analysis processes, so as to generate N filtering motion vectors. The mixer unit is coupled to the control unit and the filter units. The mixer unit weights and mixes the filtering motion vectors according to the control signal, so as to adjust and output a refined motion vector.

According to an embodiment of the invention, the motion estimation signal further includes a block matching error corresponding to the current macroblock, and the control unit includes a variation parameter calculation unit and a reliability parameter analysis unit. The variation parameter calculation unit performs a motion vector correlation calculation by using variations of the current motion vector and the surrounding motion vectors corresponding to a plurality of neighboring macroblocks, so as to calculate the variation parameter. The reliability parameter analysis unit receives and analyzes the block matching error to generate a reliability parameter, wherein the block matching error is an optimal result generated by performing block matching on the current macroblock and a plurality of macroblocks of a next frame. The value mixer is coupled to the variation parameter calculation unit and the reliability parameter analysis unit. The value mixer calculates and generates the control signal according to a mixing proportion, the variation parameter, and the reliability parameter.

According to an embodiment of the invention, the analysis processes of the filter units may be N different smooth intensities. Besides, the mixer unit adjusts N weighted values according to the control signal and adds up the product of the $i^{th}$ weighted value and the $i^{th}$ filtering motion vector, so as to generate the refined motion vector, wherein i is a positive integer and $1 \leq i \leq N$.

According to an embodiment of the invention, the control unit includes N variation parameter calculation units and a selector. The $i^{th}$ variation parameter calculation unit performs a motion vector correlation calculation by using the $i^{th}$ filtering motion vector and the surrounding motion vectors corresponding to a plurality of neighboring macroblocks around the current macroblock, so as to calculate an $i^{th}$ variation parameter. The selector is coupled to the variation parameter calculation units. The selector determines the values of the variation parameters to generate the control signal.

According to an embodiment of the invention, the mixer unit may be a multiplexer. The multiplexer outputs a selected filtering motion vector according to the control signal. Besides, the refined motion vector is output to the motion estimation unit to adjust the total motion vectors, or the refined motion vector is output to a motion compensation unit to perform a motion compensation operation.

As described above, the motion vector refining apparatus provided by an embodiment of the invention calculates variation parameters of motion vectors and analyzes a block matching error of macroblocks, so as to determine whether an output image is at the edge of a moving object and adjust and refine motion vectors output by a plurality of filter units. Thereby, when an image is at the edge of a moving object, the motion vector refining apparatus can reduce smooth intensities of the motion vectors (i.e., allow the motion vectors to have greater variations). When the motion vectors require higher smooth intensities (for example, the processed macroblock or pixel is not at the edge of the moving object), the motion vector refining apparatus adjusts and outputs motion vectors with high smooth intensities, so as to reduce image defects caused by a smooth processing.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
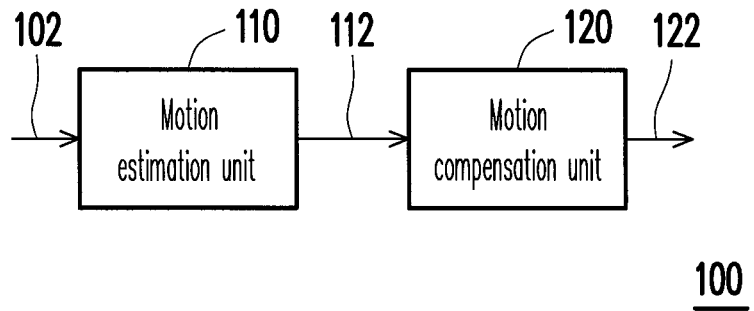
FIG. 1A is a schematic block diagram of an image motion vector estimation and compensation system.

Reference will now be made in detail to the present preferred embodiments of the invention, examples of which are illustrated in the accompanying drawings. Wherever possible, the same reference numbers are used in the drawings and the description to refer to the same or like parts.

FIG. 1A is a schematic block diagram of an image motion vector estimation and compensation system 100. The present embodiment is applicable to an image standard in the interlace scan mode or the progressive scan mode. In the present embodiment, the image signal 102 in FIG. 1A is assumed to be in the interlace scan mode. Referring to FIG. 1A, the motion estimation unit 110 receives the image signal 102, estimates the motion trajectory of a moving object in the image signal 102, generates an motion estimation signal 112, and outputs the motion estimation signal 112 to the motion compensation unit 120. The motion estimation signal 112 contains image information in unit of macroblock and corresponding motion vector information.

Figure 1B:
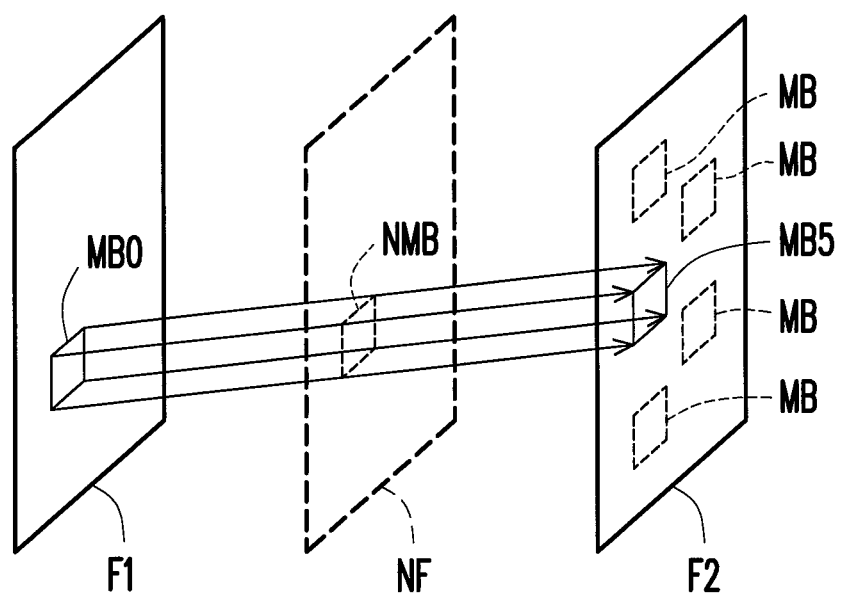
FIG. 1B is a diagram illustrating how to interpolate a new field on a motion trajectory by using an image motion vector estimation and compensation algorithm.

FIG. 1B is a diagram illustrating how to interpolate a new field NF on a motion trajectory by using an image motion vector estimation and compensation algorithm. The motion estimation unit 110 performs multiple block matching operations by using an image motion vector estimation algorithm according to a current macroblock MB0 in the field F1 of the image signal 102 and a plurality of macroblocks MB in the field F2 of the image signal 102, and the motion estimation unit 110 calculates the motion estimation signal 112 by using the current macroblock MB0 (in the field F1) and the macroblock MB5 (in the field F2) with the optimal block matching result. To be specific, after the motion estimation unit 110 calculates the block matching errors between the current macroblock MB0 and a plurality of macroblocks MB in the field F2, the smallest block matching error is considered the "optimal block matching result" (i.e., in the present embodiment, the current macroblock MB0 and the macroblock MB5 have the smallest pixel difference). Thus, the motion estimation signal 112 contains a motion vector and a block matching error corresponding to each macroblock.

The motion compensation unit 120 interpolates pixels between scan lines in the macroblock NMB on the motion trajectory by using the current macroblock MB0 and the macroblock MB5. Namely, the motion compensation unit 120 interpolates a new field NF by using the current macroblock MB0, a current motion vector MV0 (not shown), and the macroblock MB5 through the motion compensated deinterlacing technique, so as to compensate the lost field effectively and increase the vertical resolution of the output image signal 122. In the present embodiment, the lost part of an image in the progressive scan mode can also be interpolated by using the technique described above (i.e., the image signal 102 in FIG. 1 is in the progressive scan mode), so as to increase the frame rate of the output image signal 122.

In the image motion vector estimation and compensation algorithm, because the motion vectors generated through estimation may be slightly different from each other in the same moving object, a smooth processing is performed on motion vectors of neighboring macroblocks through some statistical algorithms or filtering algorithms, so as to increase the correlation between these motion vectors. For example, neighboring motion vectors are low-pass filtered by using a low-pass filter.

However, discontinuity between motion vectors may be produced at the edge of a moving object in an image (i.e., the correlation between motion vectors of neighboring macroblocks is very low). Or, when there is an irregularly moving area in an image (i.e., the block matching errors between macroblocks are large) and the smooth processing is performed to all the motion vectors, unreliable motion vectors may be produced and accordingly defects may be produced in the compensated image.

Figure 2A:
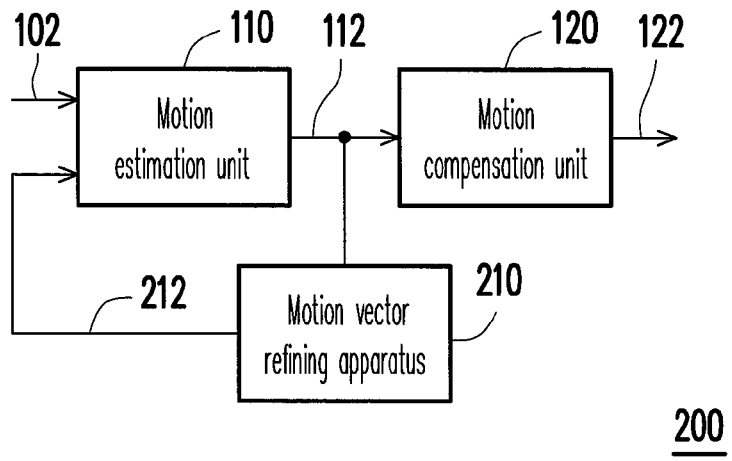
FIG. 2A is a block diagram of an image motion vector estimation and compensation system according to an embodiment of the invention.
Figure 2B:
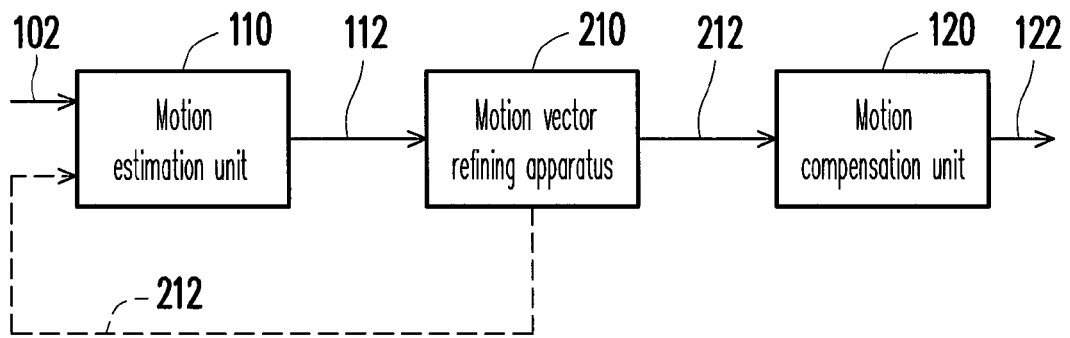
FIG. 2B is a block diagram of an image motion vector estimation and compensation system according to another embodiment of the invention.

FIG. 2A is a block diagram of an image motion vector estimation and compensation system 200 according to an embodiment of the invention, and FIG. 2B is a block diagram of an image motion vector estimation and compensation system 201 according to another embodiment of the invention. In the present embodiment, the motion vector refining apparatus 210 performs variation parameter analysis on neighboring motion vectors in the motion estimation signal 112 and performs reliability analysis on image data of neighboring macroblocks, so as to adjust and control the filtering condition of the motion vectors and allow the motion vectors at the edge of the moving object to be precise and stable. Accordingly, the processed motion vector signal 212 can be used by the motion estimation unit 110 as a reference for estimating other motion vectors (as indicated by the dotted line in FIG. 2A and FIG. 2B) or provided to the motion compensation unit 120 to perform image compensation operations (as shown in FIG. 2B).

Figure 3:
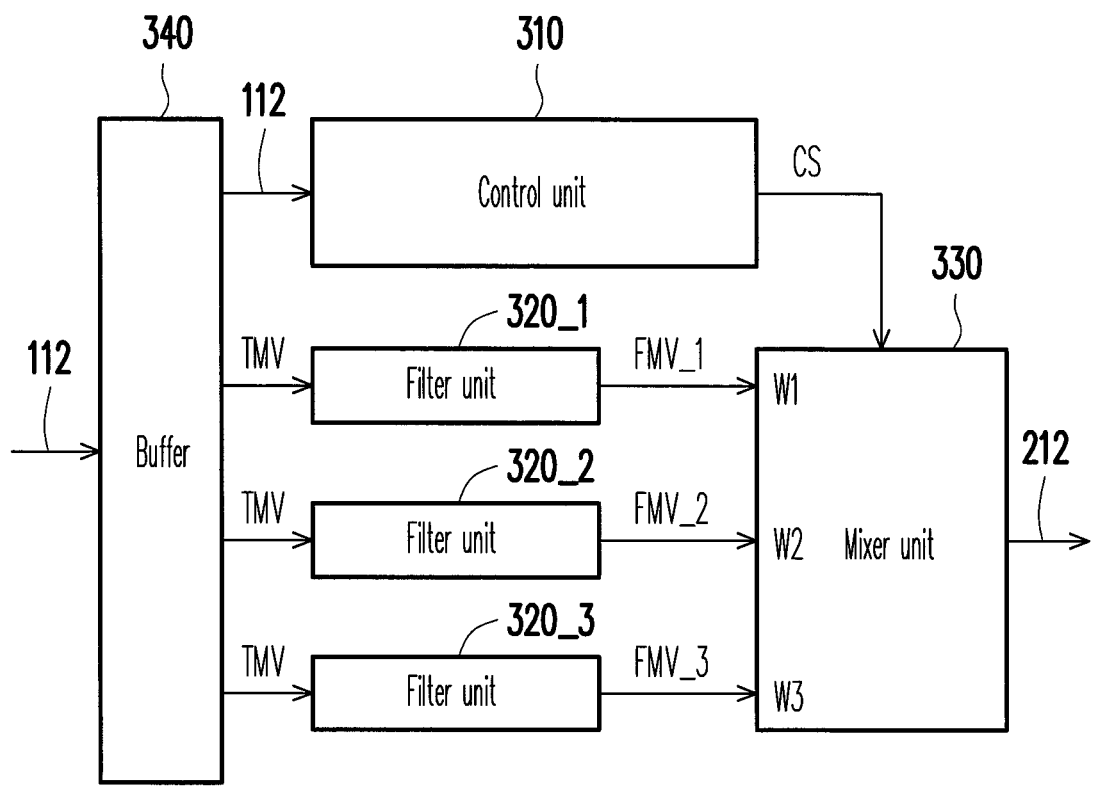
FIG. 3 is a block diagram of a motion vector refining apparatus according to a first embodiment of the invention.

FIG. 3 is a block diagram of a motion vector refining apparatus 210 according to a first embodiment of the invention. The motion vector refining apparatus 210 includes a control unit 310, N filter units 320_1-320_N, and a mixer unit 330, wherein N is a positive integer and is greater than 1. In the present embodiment, three filter units 320_1-320_3 are taken as examples (i.e., N=3). However, the invention is not limited thereto. In the present embodiment, the motion vector refining apparatus 210 further includes a buffer 340. The buffer 340 receives and buffers the motion estimation signal 112 and outputs the motion estimation signal 112 to the control unit 310. In the present embodiment, the motion estimation signal 112 contains a total motion vector TMV and a block matching error corresponding to each macroblock. The buffer 340 further respectively transmits the total motion vectors TMV to the filter units 320_1-320_N. The control unit 310 receives the motion estimation signal 112 and performs variation parameter calculation and reliability analysis by using related information (for example, variations of the current motion vector and the surrounding motion vectors and the block matching error of the current macroblock) of the motion estimation signal 112, so as to generate a control signal CS.

The filter units 320_1-320_3 respectively calculate the total motion vectors TMV by using three different analysis processes, so as to generate three filtering motion vectors FMV_1-FMV_3. Herein an "analysis process" may be the smooth intensity of a low-pass filter or a commonly-used statistical calculation (for example, histogram statistic, average statistic, or median statistic), and those skilled in the art should be able to determine the number of the filter units 320_1-320_N and the analysis processes thereof according to their own design requirements. In the present embodiment, the filter units 320_1-320_N are assumed to be low-pass filters having different smooth intensities. For example, the filter units 320_1, 320_2, and 320_3 are respectively a 3-tap, a 5-tap, and a 9-tap low-pass filter, wherein a greater tap number indicates a higher correlation between motion vectors, a higher smooth intensity, and closer values between neighboring motion vectors.

Referring to FIG. 3 again, the mixer unit 330 is coupled to the control unit 310 and the filter units 320_1-320_3. The mixer unit 330 weights and mixes the filtering motion vectors FMV_1-FMV_3 according to information carried by the control signal CS, so as to output the motion vector signal 212. Or, the mixer unit 330 selects one of the filtering motion vectors FMV_1-FMV_3 according to the control signal CS to output the motion vector signal 212. Those implementing the present embodiment can control and adjust the filtering motion vectors FMV_1-FMV_3 by using the estimation result of the control unit 310 based on the spirit of the invention.

Figure 4A:
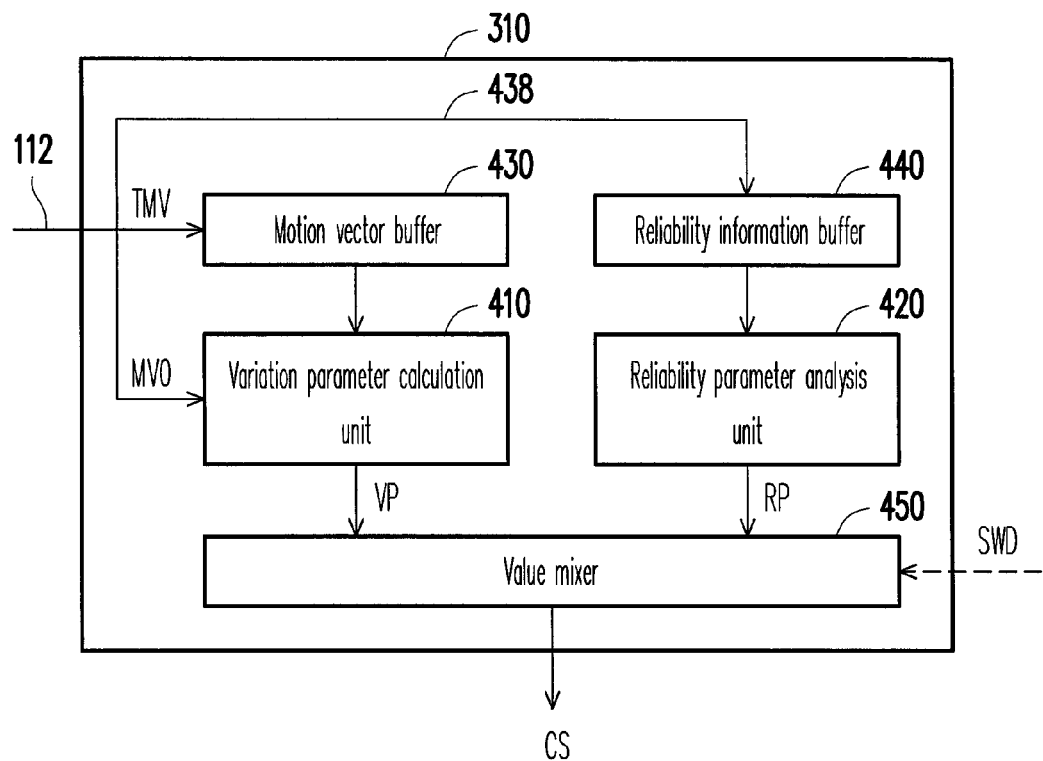
FIG. 4A is a block diagram of a control unit in FIG. 3.
Figure 4B:
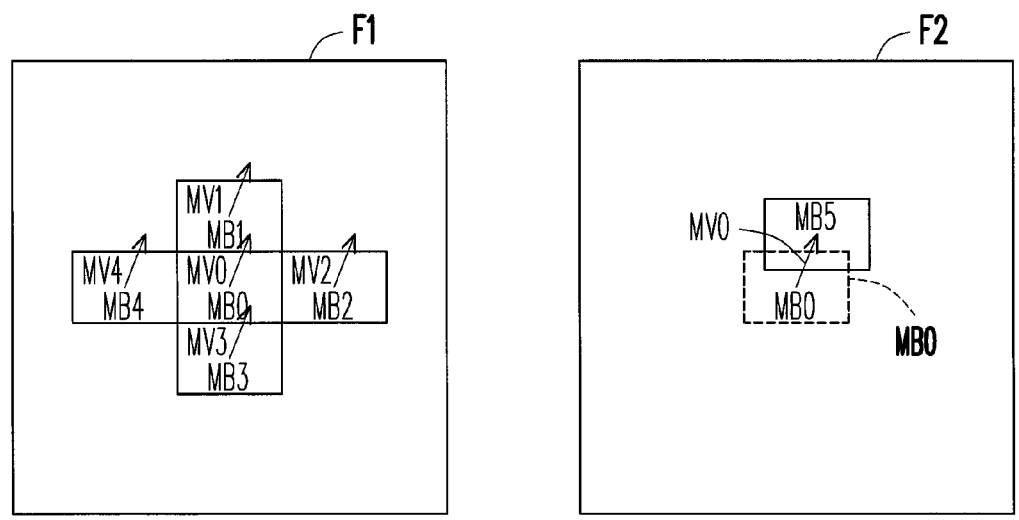
FIG. 4B is a diagram illustrating how to calculating reliability information by using a current macroblock.

Herein the operation, function, and structure of the control unit 310 in the first embodiment will be described in detail. FIG. 4A is a block diagram of the control unit 310 in FIG. 3, and FIG. 4B is a diagram illustrating how to calculate reliability information by using the current macroblock MB0. As shown in FIG. 4A and FIG. 4B, the control unit 310 includes a motion vector buffer 430 and a reliability information buffer 440. The motion vector buffer 430 and the reliability information buffer 440 respectively receive the total motion vectors TMV of the motion estimation signal 112 and a block matching error 438 calculated by the motion estimation unit 110. The motion vector buffer 430 buffers the current motion vector MV0 corresponding to the current macroblock MB0 and the surrounding motion vectors MV1-MV4 corresponding to the neighboring macroblocks MB1-MB4 (as shown in FIG. 4B), and the reliability information buffer 440 buffers the block matching error 438 corresponding to the current macroblock MB0.

Figure 5:
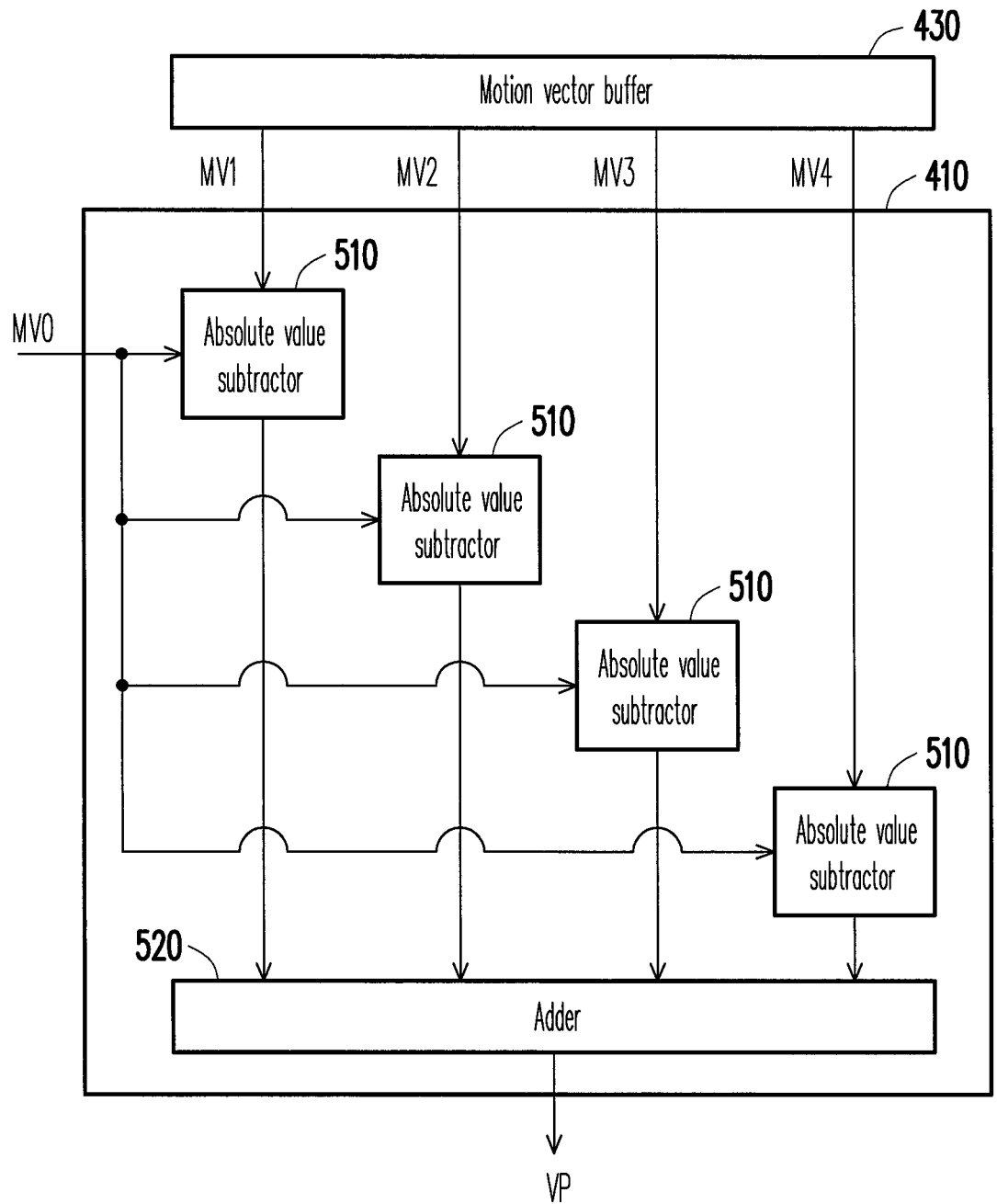
FIG. 5 is a block diagram of a variation parameter calculation unit in FIG. 4A.

In the present embodiment, the current motion vector MV0 and the surrounding motion vectors MV1-MV4 are respectively the optimal motion trajectories of the current macroblock MB0 and the neighboring macroblocks MB1-MB4 from the field F1 to the field F2. Referring to FIG. 4A, the variation parameter calculation unit 410 performs a motion vector correlation calculation (for example, a sum of absolute difference (SAD) calculation) according to the motion vectors MV0-MV4, so as to analyze whether there is any large variation between the current motion vector MV0 and the surrounding motion vectors MV1-MV4. FIG. 5 is a block diagram of the variation parameter calculation unit 410 in FIG. 4A. In the present embodiment, the variation parameter calculation unit 410 receives the current motion vector MV0 and the surrounding motion vectors MV1-MV4 and performs a SAD calculation by using the absolute value subtractor 510 and the adder 520, so as to calculate a variation parameter VP. In other words, in the present embodiment, the variation parameter calculation unit 410 calculates the variation parameter VP by using following formula (1):

$$VP = (|MV0-MV1|+|MV0-MV2|+|MV0-MV3|+|MV0-MV4|) \qquad (1)$$

However, the invention is not limited to foregoing formula (1), and in other embodiments, the motion vector correlation calculation may also be replaced by a variance calculation in which the differences between the motion vectors are squared and added up.

In the present embodiment, the macroblocks MB1-MB4 above, below, to the left of, and to the right of the current macroblock MB0 are considered the neighboring macroblocks of the current macroblock MB0, so as to define the surrounding motion vectors MV1-MV4 of the current motion vector MV0. However, the surrounding motion vectors MV1-MV4 should be defined according to the motion vector spatial correlation algorithm, and those implementing the present embodiment should determine the range of the surrounding motion vectors according to their design requirements, so as to determine the method for calculating the variation parameters adopted by the variation parameter calculation unit 410. In other embodiments, the variation parameter calculation unit 410 may also select the upper left, lower left, upper right, and lower right motion vectors around the current macroblock MB0 to calculate the variation parameters.

The reliability parameter analysis unit 420 in FIG. 4A receives and analyzes the block matching error 438 in the motion estimation signal 112 and outputs a reliability parameter RP. As described above, the block matching error 438 is the optimal block matching result generated by performing block matching on the current macroblock MB0 and the macroblock MB5 of the next image. In the motion estimation signal 112 generated by the motion estimation unit 110, the block matching error 438 is the image similarity between the current macroblock MB0 and the macroblocks of the next image calculated through a mean absolute difference (MAD) algorithm, a mean squared error (MSE) algorithm, or a sum of absolute difference (SAD) algorithm. However, the present embodiment is not limited thereto. In the present embodiment, a smaller block matching error 438 indicates a more precise current motion vector MV0 and a smaller reliability parameter RP. Contrarily, a greater difference between the current macroblock MB0 and the neighboring macroblocks MB1-MB4 indicates a more inaccurate current motion vector MV0 and a greater reliability parameter RP.

A value mixer 450 is coupled to the variation parameter calculation unit 410 and the reliability parameter analysis unit 420. The value mixer 450 mixes the variation parameter VP and the reliability parameter RP according to a mixing proportion SWD between the variation parameter VP and the reliability parameter RP, so as to generate the control signal CS. Those implementing the present embodiment can permanently store the mixing proportion SWD in the value mixer 450 or manually adjust the mixing proportion SWD (as indicated by the dotted line in FIG. 4A) according to their design requirements, so as to accomplish the spirit of the embodiment. In the present embodiment, the value mixer 450 calculates the value CSV of the control signal CS by assuming the mixing proportion of the variation parameter VP to be 3 and the mixing proportion of the reliability parameter RP to be 1 (as indicated in following formula (2)):

$$CSV = 3 \times VP + 1 \times RP \quad (2)$$

Figure 6:
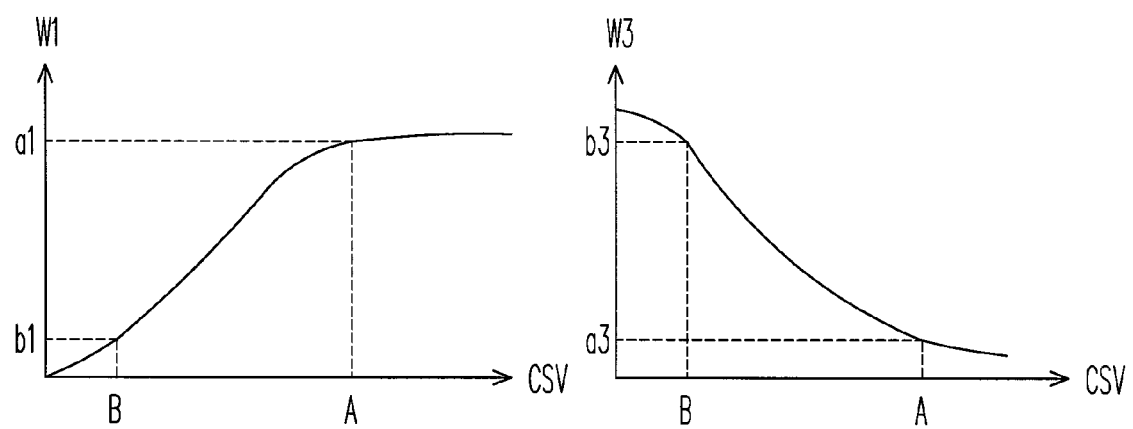
FIG. 6 is a graph illustrating how a mixer unit generates weighted values W1 and W3 according to a value CSV of a control signal.

Referring to FIG. 3 again, the mixer unit 330 is coupled to the control unit 310 and the filter units 230_1-320_3. The mixer unit 330 generates three weighted values W1-W3 according to the control signal CS. FIG. 6 is a graph illustrating how the mixer unit 330 generates the weighted values W1 and W3 according to the value CSV of the control signal CS. The graphs of the weighted values W1 and W3 and the value CSV in FIG. 6 can be generated based on experimental data, and the data used herein is only used as reference.

As described above, the value CSV of the control signal CS is generated by weighting and mixing the variation parameter VP and the reliability parameter RP. Thus, if the variation parameter VP has a large value (i.e., the spatial correlation between the motion vectors MV0-MV4 is low) and the reliability parameter RP also has a large value (i.e., no optimal motion vector is found after performing block matching estimation on the current macroblock MB0 in FIG. 4B) (as indicated by spot A in FIG. 6), there is a high possibility that the current macroblock MB0 is located at the edge of the moving object. In this case, the mixer unit 330 increases the weighted value W1 (for example, to a value a1) corresponding to the filter unit 320_1 (the 3-tap low-pass filter) which has a lower smooth intensity and reduces the weighted value W3 (for example, to a value a3) corresponding to the filter unit 320_3 (the 9-tap low-pass filter) which has a higher smooth intensity, so as to reduce the correlation between the motion vectors.

Contrarily, if the variation parameter VP has a small value (i.e., there is a high correlation between the motion vectors) and the reliability parameter RP also has a small value (i.e., an optimal motion vector is found after performing block matching estimation on the current macroblock MB0 in FIG. 4B) (as indicated by spot B in FIG. 6), the current macroblock MB0 is located within the moving object or in a same moving object. In this case, the mixer unit 330 reduces the weighted value W1 (for example, to a value b1) corresponding to the filter unit 320_1 (the 3-tap low-pass filter) which has a lower smooth intensity and increases the weighted value W3 (for example, to a value b3) corresponding to the filter units 320_3 (the 9-tap low-pass filter) which has a higher smooth intensity, so as to make neighboring motion vectors close to each other and achieve a smooth effect.

Thereby, after the mixer unit 330 in FIG. 3 generates a refined motion vector RMV by using following formula (3), the mixer unit 330 adjusts the refined motion vector RMV into the motion vector signal 212 and outputs the motion vector signal 212:

$$RMV = W1 \times FMV\_1 + W2 \times FMV\_2 + W3 \times FMV\_3 \quad (3)$$

Figure 7:
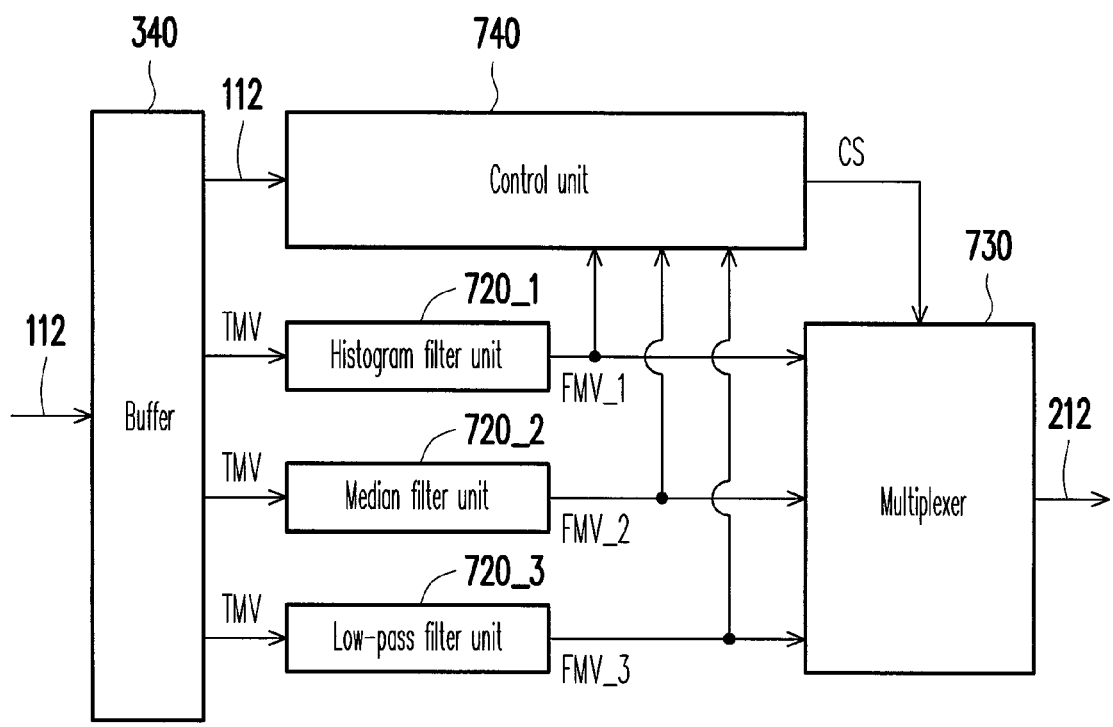
FIG. 7 is a block diagram of a motion vector refining apparatus according to a second embodiment of the invention.

Another embodiment of the invention will be further described herein with reference to FIG. 7. FIG. 7 is a block diagram of a motion vector refining apparatus 710 according to a second embodiment of the invention. The difference between the present embodiment and the first embodiment is that the filter units 720_1-720_3 in the present embodiment are assumed to be a histogram filter unit 720_1, a median filter unit 720_2, and a low-pass filter unit 720_3. The histogram filter unit 720_1 obtains the most frequently appearing surrounding macroblock as a filtering motion vector FMV_1 through histogram statistic, the median filter unit 720_2 serves a median of surrounding motion vectors as a filtering motion vector FMV_2, and the low-pass filter unit 720_3 averages the surrounding motion vectors to output a filtering motion vector FMV_3.

Figure 8:
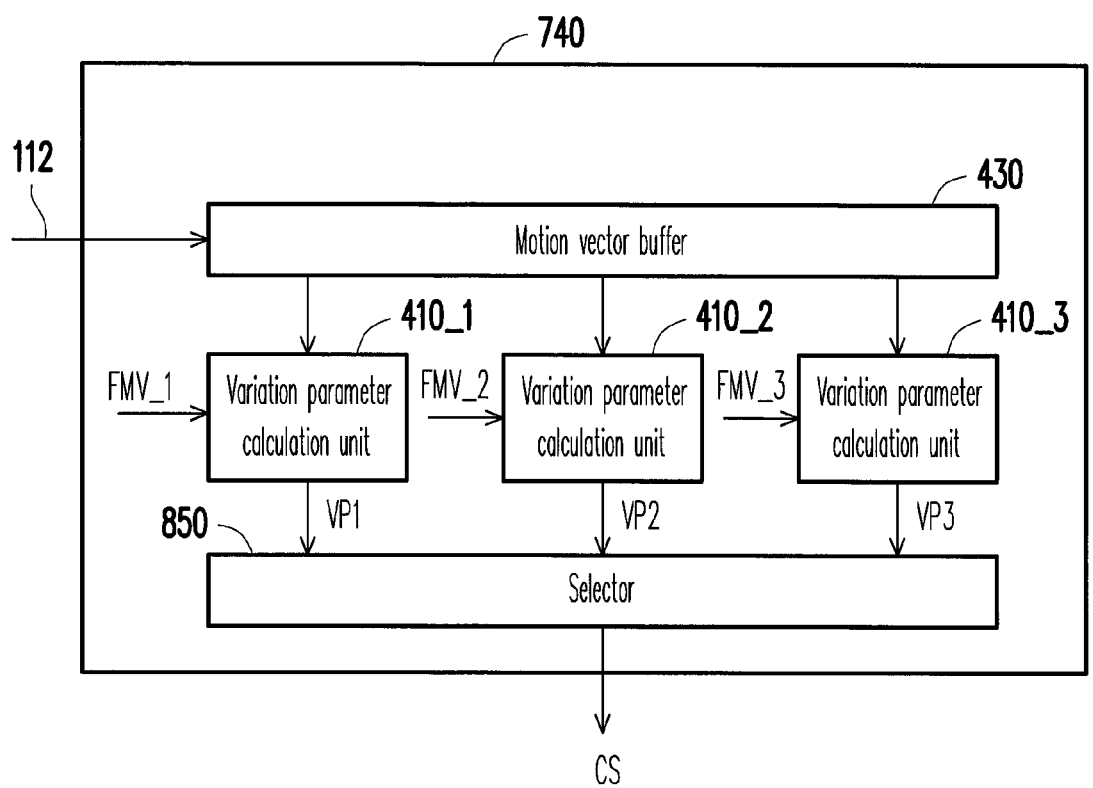
FIG. 8 is a block diagram of a control unit in FIG. 7.

In addition, the difference between the control unit 740 (as shown in FIG. 8, which is a block diagram of the control unit 740 in FIG. 7) in the second embodiment and the control unit 310 (as shown in FIG. 4A) in the first embodiment is that the control unit 740 has N variation parameter calculation units 410_1-410_3 (in the present embodiment, N=3; however, the invention is not limited thereto), wherein the variation parameter calculation units 410_1-410_3 respectively receive the filtering motion vectors FMV_1-FMV_3 to calculate variation parameters VP1-VP3. The operations and circuit structures of the variation parameter calculation units 410_1-410_3 are similar to those of the variation parameter calculation unit 410 in the first embodiment, and the difference is that the variation parameter calculation units 410_1-410_3 in the present embodiment respectively replace the current motion vector MV0 of the variation parameter calculation unit 410 in the first embodiment by using the filtering motion vectors FMV_1-FMV_3. The replacement can be implemented by those skilled in the art and will not be described herein.

As described above, the selector 850 in FIG. 8 determines the smallest one of the variation parameters VP1-VP3 (herein it is assumed that the variation parameter VPi is the smallest, wherein i is a positive integer and 1≤i≤N) to obtain the filtering motion vector FMV_i most suitable for the current macroblock and generates a control signal CS. Next, referring to FIG. 7 again, the multiplexer 730 selects and outputs the most suitable filtering motion vector FMV_i according to the control signal CS.

In summary, a motion vector refining apparatus provided by an embodiment of the invention calculates variation parameters of motion vectors and analyzes block matching errors of macroblocks, so as to determine whether an output image is at the edge of a moving object and adjust and refine the motion vectors output by a plurality of filter units accordingly. Thereby, when an image is at the edge of a moving object, the motion vector refining apparatus reduces the smooth intensities of the motion vectors (i.e., allows the motion vectors to have greater variations). When the motion vectors require higher smooth intensities (for example, the macroblocks are not located at the edge of the moving object), the motion vector refining apparatus adjusts and outputs motion vectors with higher smooth intensities, so as to reduce image defects caused by a smooth processing.

Moreover, in an embodiment of the invention, a refined motion vector is output to a motion compensation unit to perform precise motion compensation. The refined motion vector may also be provided to a motion estimation unit to allow the motion estimation unit to precisely estimate the motion vectors required by an image.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A motion vector refining apparatus, comprising:
   a control unit, receiving a motion estimation signal generated by a motion estimation unit, wherein the motion estimation signal comprises a plurality of total motion vectors, the total motion vectors comprise a current motion vector corresponding to a current macroblock and a plurality of surrounding motion vectors, and the control unit calculates a variation parameter according to the current motion vector and the surrounding motion vectors to generate a control signal, wherein the control unit comprises:
      N variation parameter calculation units, wherein the ith variation parameter calculation unit performs a motion vector correlation calculation by using the ith filtering motion vector and the surrounding motion vectors corresponding to a plurality of neighboring macroblocks around the current macroblock, so as to calculate an ith variation parameter, wherein i is a positive integer and $1 \leq i \leq N$; and
      a selector, coupled to the variation parameter calculation units, determining values of the variation parameters to generate the control signal;
   N filter units, analyzing the total motion vectors by using N analysis processes to calculate N filtering motion vectors, wherein N is a positive integer and is greater than 1; and
   a mixer unit, coupled to the control unit and the filter units, weighting and mixing the filtering motion vectors according to the control signal to adjust and output a refined motion vector.

2. The motion vector refining apparatus according to claim 1 further comprising:
   a buffer, coupled to the control unit and the filter units, receiving and buffering the motion estimation signal.

3. The motion vector refining apparatus according to claim 1, wherein the motion estimation signal further comprises a block matching error corresponding to the current macroblock, and the control unit comprises:
   a variation parameter calculation unit, performing a motion vector correlation calculation by using variations of the current motion vector and the surrounding motion vectors corresponding to a plurality of neighboring macroblocks around the current macroblock, so as to calculate a variation parameter;
   a reliability parameter analysis unit, receiving and analyzing the block matching error to generate a reliability parameter, wherein the block matching error is an optimal result generated by performing block matching on the current macroblock and a plurality of macroblocks of a next frame; and
   a value mixer, coupled to the variation parameter calculation unit and the reliability parameter analysis unit, mixing the variation parameter and the reliability parameter according to a mixing proportion to generate the control signal.

4. The motion vector refining apparatus according to claim 3, wherein the motion vector correlation calculation is to perform a sum of absolute difference (SAD) calculation or a variance calculation on the surrounding motion vectors by using the current motion vector.

5. The motion vector refining apparatus according to claim 3, wherein the control unit further comprises:
   a motion vector buffer, receiving and buffering the current motion vector and the surrounding motion vectors; and
   a reliability information buffer, receiving and buffering the block matching error corresponding to the current macroblock.

6. The motion vector refining apparatus according to claim 3, wherein the block matching error is an optimal result generated by performing one of a mean absolute difference (MAD) calculation, a SAD calculation, and a variance calculation on corresponding pixels in the current macroblock and the macroblocks of the next frame.

7. The motion vector refining apparatus according to claim 1, wherein the analysis processes of the filter units are respectively N smooth intensities, and the smooth intensities are different from each other.

8. The motion vector refining apparatus according to claim 1, wherein the mixer unit adjusts N weighted values according to the control signal and adds up a product of the ith weighted value and the ith filtering motion vector, so as to generate the refined motion vector, wherein i is a positive integer and $1 \leq i \leq N$.

9. The motion vector refining apparatus according to claim 8, wherein when a value of the control signal increases, the mixer unit increases the ith weighted value corresponding to the ith filter unit having a low smooth intensity and decreases the ith weighted value corresponding to the ith filter unit having a high smooth intensity.

10. The motion vector refining apparatus according to claim 1, wherein the control unit further comprises:
    a motion vector buffer, coupled to the variation parameter calculation units, receiving and buffering the surrounding motion vectors corresponding to the neighboring macroblocks.

11. The motion vector refining apparatus according to claim 1, wherein when the selector determines that the ith variation parameter has a minimum value among the variation parameters, the selector controls the mixer unit by using the control signal to output the ith filtering motion vector.

12. The motion vector refining apparatus according to claim 1, wherein the mixer unit is a multiplexer, and the multiplexer outputs one of the filtering motion vectors according to the control signal.

13. The motion vector refining apparatus according to claim 1, wherein the filter units comprise:
    a low-pass filter unit, filtering the total motion vectors according to a low-pass filtering condition, so as to generate a low-pass filter vector;
    a median filter unit, calculating a median of the total motion vectors and outputting a median filter vector corresponding to the median; and
    a histogram filter unit, counting the total motion vectors to output one of the motion vectors which has a highest appearance probability as a histogram filter vector.

14. The motion vector refining apparatus according to claim 1, wherein the refined motion vector is output to the motion estimation unit to adjust the total motion vectors.

15. The motion vector refining apparatus according to claim 1, wherein the refined motion vector is output to a motion compensation unit to perform a motion compensation operation.

* * * * *